(12) United States Patent
Yeo et al.

(10) Patent No.: US 12,498,809 B2
(45) Date of Patent: Dec. 16, 2025

(54) MOUSE PAD

(71) Applicant: Razer (Asia-Pacific) Pte. Ltd, Singapore (SG)

(72) Inventors: Melvin Yeo, Singapore (SG); Lionel Lim, Singapore (SG); Ayush Sharma, Singapore (SG); Kheng Choong Koh, Singapore (SG)

(73) Assignee: Razer (Asia-Pacific) Pte. Ltd, Singapore (SG)

( * ) Notice: Subject to any disclaimer, the term of this patent is extended or adjusted under 35 U.S.C. 154(b) by 0 days.

(21) Appl. No.: 18/866,602

(22) PCT Filed: Jul. 25, 2022

(86) PCT No.: PCT/SG2022/050528
§ 371 (c)(1),
(2) Date: Nov. 18, 2024

(87) PCT Pub. No.: WO2024/025454
PCT Pub. Date: Feb. 1, 2024

(65) Prior Publication Data
US 2025/0306695 A1    Oct. 2, 2025

(51) Int. Cl.
*G06F 3/039* (2013.01)
*F21V 33/00* (2006.01)

(52) U.S. Cl.
CPC ........ *G06F 3/0395* (2013.01); *F21V 33/0052* (2013.01); *F21V 2200/20* (2015.01)

(58) Field of Classification Search
CPC .................................................. G06F 3/0395
(Continued)

(56) References Cited

U.S. PATENT DOCUMENTS 6,332,533 B1 * 12/2001 Howisen ............... G06F 3/0395
                                                    108/14
6,635,336 B1    10/2003 Chen et al.
(Continued)

FOREIGN PATENT DOCUMENTS

CN          110609630 A      12/2019
CN          210955007 U       7/2020
(Continued)

OTHER PUBLICATIONS

HyperX FURY Ultra—Gaming Mouse Pad (https://www.hyperxgaming.com/en/mouse-pad/fury-ultra-rgb-gaming-mouse-pad).
(Continued)

*Primary Examiner* — Calvin C Ma
(74) *Attorney, Agent, or Firm* — Polsinelli PC

(57) ABSTRACT

A mouse pad may be provided. The mouse pad may include a base and a mat. The mouse pad may further include a lighting assembly sandwiched between the base and the mat. The lighting assembly may include a light-transmission body sandwiched between the base and the mat, the light-transmission body having a peripheral edge portion exposed from between the base and the mat. The lighting assembly may further include a light-emitting arrangement that may include an elongate-shaped substrate, and a plurality of light sources distributed lengthwise along a length of a mounting surface of the elongate-shaped substrate. The light-emitting arrangement and the light-transmission body may be assembled together in a manner to transmit light from the plurality of light sources through the light-transmission body for illuminating the peripheral edge portion of the light-transmission body.

18 Claims, 6 Drawing Sheets

(58) Field of Classification Search
USPC .......................................................... 345/163
See application file for complete search history.

(56) References Cited

U.S. PATENT DOCUMENTS

| | | | |
|---|---|---|---|
| 7,227,530 B1* | 6/2007 | Yang | G06F 3/0202 |
| | | | 345/161 |
| 8,651,720 B2 | 2/2014 | Sherman et al. | |
| 10,216,298 B2 | 2/2019 | Chou | |
| 10,622,405 B2 | 4/2020 | Diana et al. | |
| 2004/0224107 A1 | 11/2004 | Lewis | |
| 2018/0224953 A1 | 8/2018 | Chou | |
| 2018/0239073 A1 | 8/2018 | Chou | |
| 2018/0239075 A1 | 8/2018 | Chou | |
| 2019/0302906 A1 | 10/2019 | Chou | |
| 2022/0075460 A1* | 3/2022 | Berkovitz | G06F 1/1632 |

FOREIGN PATENT DOCUMENTS

| | | |
|---|---|---|
| KR | 100421900 B1 | 4/2004 |
| KR | 102267598 B1 | 6/2021 |
| TW | I680386 B | 12/2019 |

OTHER PUBLICATIONS

Offbeat—RGB Gaming Mouse Pad, Non-Slip Rubber Base, Soft Glowing 14 LED Modes | 2 Brightness Mode | Large Extended Gaming Desk Keyboard Pad Mat (800 x 300 x 4 Mm) XXL (https://www.amazon.in/Offbeat-Million-Lighting-Non-Slip-Water-Resistance/dp/B07WQM3RS4?th=1).
Zeb-Blaze RGB (https://zebronics.com/products/zeb-blaze-rgb).
European Search Report; dated Jul. 30, 2025; Application # 22953284. 1.

* cited by examiner

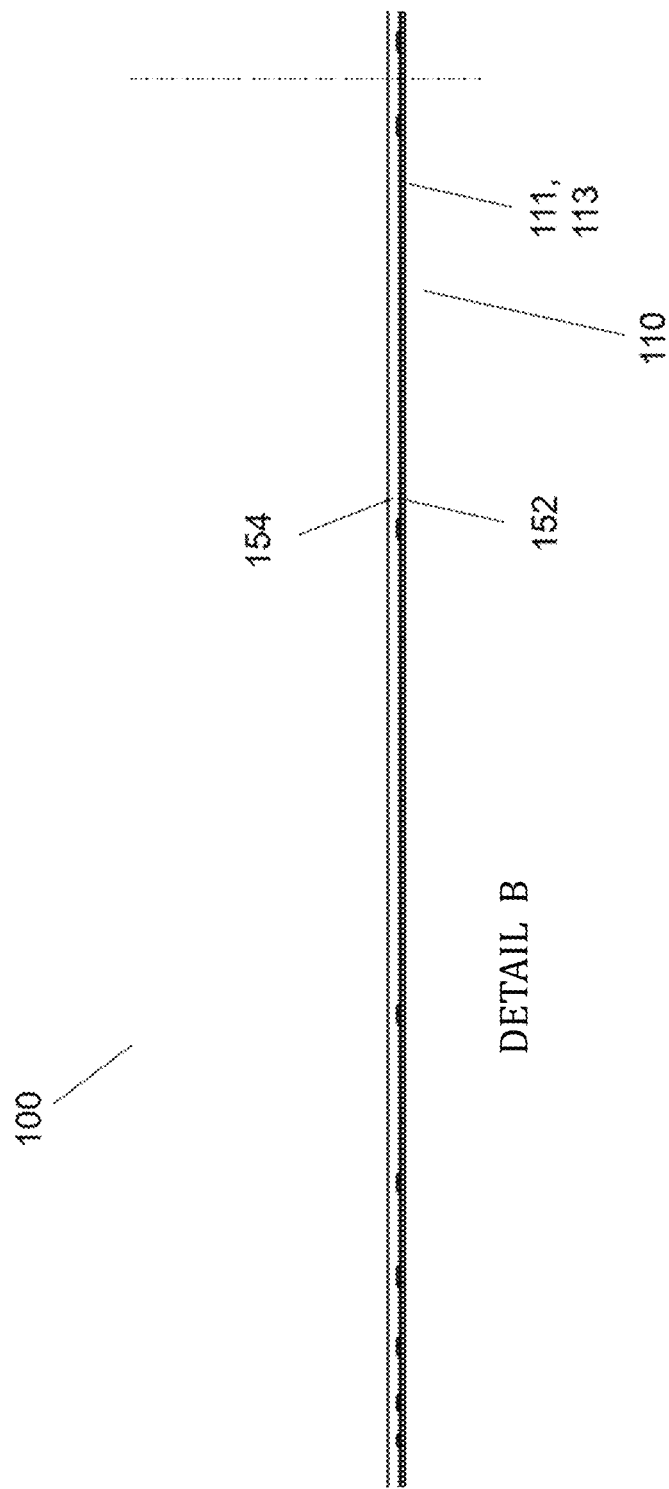

MOUSE PAD

TECHNICAL FIELD

Embodiments generally relate to mouse pad, and particularly to a mouse pad capable of displaying a lighting effect.

BACKGROUND

Mouse pads are generally used to provide a mouse device with a dedicated surface to glide on.

In particular, mousepads may enhance a usability of a mouse device by providing an even surface that allows the mouse device to measure movement without jitter.

With the advent of optical mouse devices, much research has gone into developing materials for mouse pads which are easy to read and smooth to glide on by optical mouse devices.

Other than the above focus on such materials for mouse pads, there appears to be little research that goes into developing a mouse pad with enhanced features.

SUMMARY

According to various embodiments, a mouse pad may be provided. The mouse pad may include a base and a mat. The mouse pad may further include a lighting assembly sandwiched between the base and the mat. The lighting assembly may include a light-transmission body sandwiched between the base and the mat, the light-transmission body having a peripheral edge portion exposed from between the base and the mat. The lighting assembly may further include a light-emitting arrangement that may include an elongate-shaped substrate, and a plurality of light sources distributed lengthwise along a length of a mounting surface of the elongate-shaped substrate. The light-emitting arrangement and the light-transmission body may be assembled together in a manner to transmit light from the plurality of light sources through the light-transmission body for illuminating the peripheral edge portion of the light-transmission body.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1D and FIG. 1E show schematic close-up side views of the mouse pad of FIG. 1C, according to various embodiments.

DETAILED DESCRIPTION

Figure 1A:
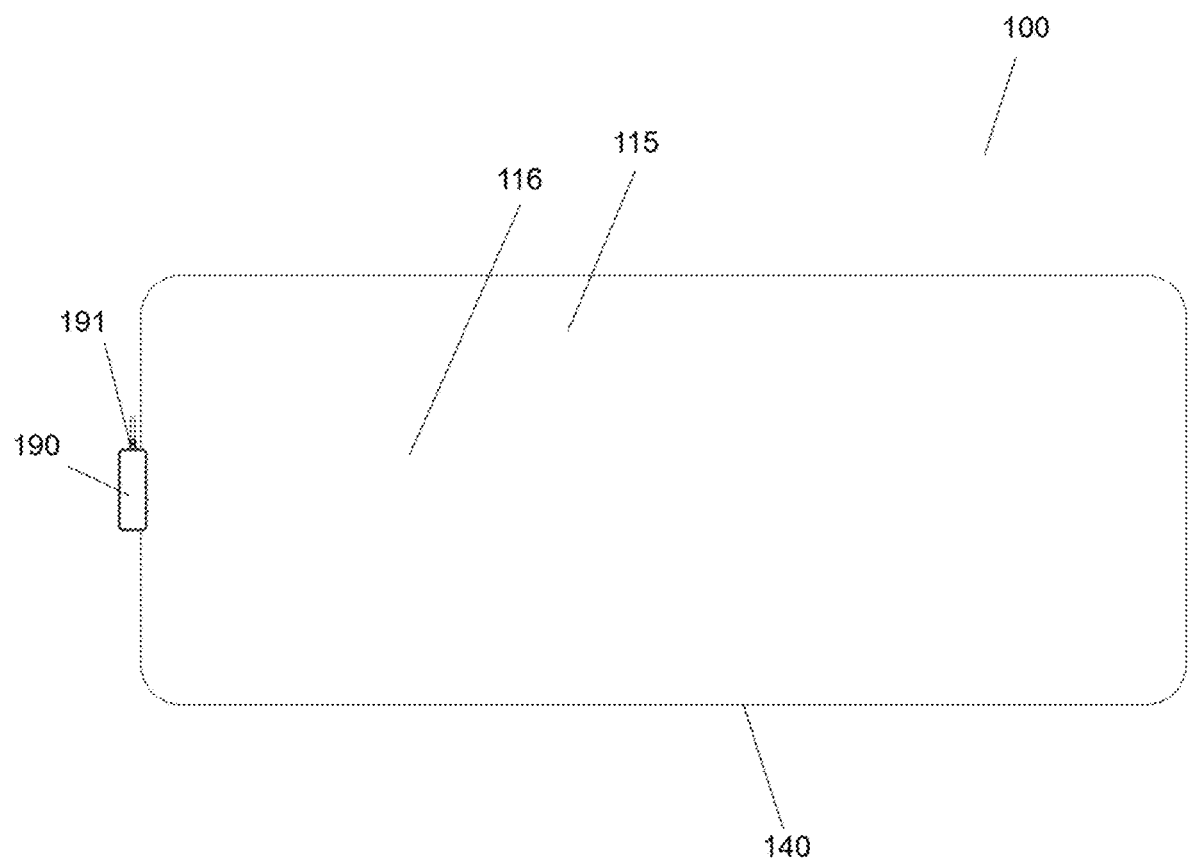
FIG. 1A shows a schematic top view of a mouse pad, according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments seek to provide a mouse pad (or mousepad or mouse mat, e.g. a mouse pad device) capable of displaying lighting effects. In various embodiments, the mouse pad may be provided with a plurality of light sources for equipping the mouse pad with lighting capabilities. In particular, the plurality of light sources may be positioned within a center or middle region of the mouse pad, while light emitted from the plurality of light sources may be visible (e.g. to a user of the mouse pad) via an exposed peripheral edge portion (e.g. edge/side) of the mouse pad.

According to various embodiments, the plurality of light sources may be arranged in a manner such that the mouse pad may be capable of evenly or uniformly illuminating its peripheral edge portion. For example, the plurality of light sources may be respectively positioned such that a distance between each light source and a corresponding segment of the peripheral edge portion may be similar as one another or vary within a small range from each other.

Additionally, according to various embodiments, the plurality of light sources may be arranged in a manner so as to minimize a number of hot spots within the mouse pad—when power or electricity is supplied to the plurality of light sources—while enabling the mouse pad to be capable of uniform (e. g. generally uniform) illumination through its peripheral edge portion. For example, the plurality of light sources of the mouse pad according to various embodiments may be spaced apart from each other in a non-uniform manner and/or may be oriented to face different directions.

The following examples pertain to various embodiments.

Example 1 is a mouse pad. The mouse pad may include a base and a mat. The mouse pad may further include a lighting assembly sandwiched between the base and the mat. The lighting assembly may include a light-transmission body sandwiched between the base and the mat, the light-transmission body having a peripheral edge portion exposed from between the base and the mat. The lighting assembly may further include a light-emitting arrangement that may include an elongate-shaped substrate, and a plurality of light sources distributed lengthwise along a length of a mounting surface of the elongate-shaped substrate. The light-emitting arrangement and the light-transmission body may be assembled together in a manner to transmit light from the plurality of light sources through the light-transmission body for illuminating the peripheral edge portion of the light-transmission body.

In Example 2, the subject matter of Example 1 may include that wherein the base is a flexible base. Further, the mat may be a flexible mat. Further, the light-transmission body may be a flexible light-transmission body. Further, the substrate may be a flexible substrate.

In Example 3, the subject matter of Example 1 or Example 2 may include that wherein the light-transmission body is an elongate-shaped light-transmission body and wherein the light-emitting arrangement and the light-transmission body are assembled together with the elongate-shaped substrate aligned longitudinally with respect to the elongate-shaped light-transmission body.

In Example 4, the subject matter of Example 3 may include that wherein the elongate-shaped substrate is centrally aligned with respect to the elongate-shaped light-transmission body such that a longitudinal centreline of the elongate-shaped substrate coincides with a longitudinal centreline of the elongate-shaped light-transmission body.

In Example 5, the subject matter of any one of Examples 1 to 4 may include that wherein the peripheral edge portion of the light-transmission body extends around a perimeter of the mat. Further, the plurality of light sources may include: a first sub-set of light sources configured to illuminate a first quadrant of peripheral edge portion of the light-transmission body, a second sub-set of light sources configured to illuminate a second quadrant of the peripheral edge portion of the light-transmission body, a third sub-set of light sources configured to illuminate a third quadrant of the peripheral edge portion of the light-transmission body, and a fourth sub-set of light sources configured to illuminate a fourth quadrant of the peripheral edge portion of the light-transmission body. Each quadrant of the peripheral edge portion of the light-transmission body may be defined by a longitudinal centreline of the light-transmission body and a transverse centreline of the light-transmission body.

In Example 6, the subject matter of any one of Example 5 may include that wherein light sources among each sub-set of light sources are oriented with beam axes directed in different directions from each other in a manner so as to form different angles with respect to the longitudinal centreline of the light-transmission body.

In Example 7, the subject matter of any one of Example 5 or Example 6 may include that wherein each quadrant of the peripheral edge portion of the light-transmission body includes a longitudinal edge segment of the light-transmission body, a lateral edge segment of the light-transmission body, and a corner segment of the light-transmission body whereby the longitudinal edge segment and the lateral edge segment meet. Further, each sub-set of light sources of the plurality of light sources may include: at least one light source oriented to illuminate the longitudinal edge segment of the light-transmission body, at least one light source oriented to illuminate the lateral edge segment of the light-transmission body, and at least one light source oriented to illuminate the corner segment of the light-transmission body.

In Example 8, the subject matter of Example 7 may include that wherein the at least one light source for illuminating the longitudinal edge segment of the light-transmission body is oriented with a beam axis intersecting the longitudinal edge segment of the light-transmission body in a non-perpendicular manner. Further, the at least one light source for illuminating the lateral edge segment of the light-transmission body may be oriented with a beam axis intersecting the lateral edge segment of the light-transmission body in a non-perpendicular manner. Further, the at least one light source for illuminating the corner segment of the light-transmission body may be oriented with a beam axis directed in a direction non-perpendicular to the longitudinal edge segment of the light-transmission body and non-perpendicular to the lateral edge segment of the light-transmission body in a non-perpendicular manner.

In Example 9, the subject matter of any one of Examples 5 to 8 may include that wherein each sub-set of light sources of the plurality of light sources is distributed lengthwise along the elongate-shaped substrate in a manner so as to be spaced apart from each other at increasing intervals towards the transverse centreline of the light-transmission body.

In Example 10, the subject matter of any one of Examples 1 to 9 may include that wherein the plurality of light sources includes 32 light sources.

In Example 11, the subject matter of any one of Examples 5 to 9 may include that wherein each sub-set of light sources of the plurality of light sources includes 8 light sources.

In Example 12, the subject matter of any one of Examples 1 to 11 may include that wherein the mat is smaller than the light-transmission body, and the mat and the light-transmission body are arranged in a concentric manner such that the peripheral edge portion of the light-transmission body exposed between the mat and the base includes a border region of the light-transmission body extending outwardly from a perimeter of the mat to a perimeter of the light-transmission body. The border region of the light-transmission body may have a width with a range of 1 mm to 4 mm.

In Example 13, the subject matter of any one of Examples 1 to 12 may include that wherein the light-transmission body includes at least one hole for accommodating the plurality of light sources therein. The at least one hole may define an internal surface serving as a light input surface through which light from the plurality of light sources is transmitted into the light-transmission body.

In Example 14 the subject matter of Example 13 may include that wherein the light-transmission body includes a plurality of holes, wherein each light source of the plurality of light sources is accommodated within a corresponding hole of the plurality of holes.

In Example 15, the subject matter of any one of Examples 1 to 14 may further include a controller electrically coupled to the plurality of light sources and configured to control at least one of a brightness, a colour, a lighting pattern, or a lighting duration of the plurality of light sources.

In Example 16, the subject matter of Example 15 may include that wherein the controller includes an interface for connecting to a power source.

In Example 17, the subject matter of Example 15 or Example 15 may include that wherein the controller is disposed at a lateral edge of the light-transmission body and is connected to a longitudinal end of the elongate-shaped substrate.

In Example 18, the subject matter of any one of Examples 1 to 17 may include that wherein an exposed surface of the base includes an anti-slip arrangement.

Figure 1B:
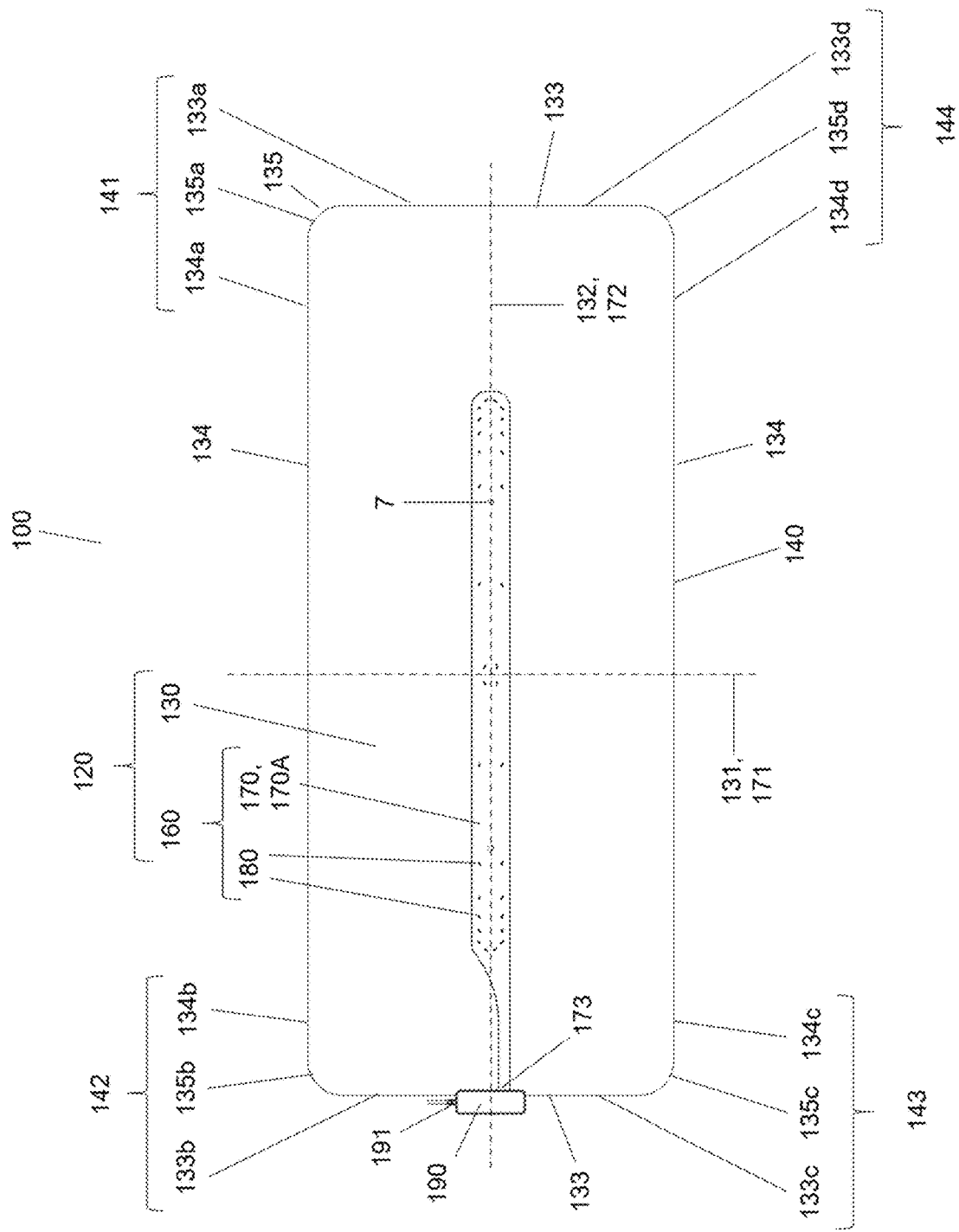
FIG. 1B shows a schematic top view of the mouse pad of FIG. 1A with a mat of the mouse pad removed to expose a lighting assembly of the mouse pad, according to various embodiments.
Figure 1C:
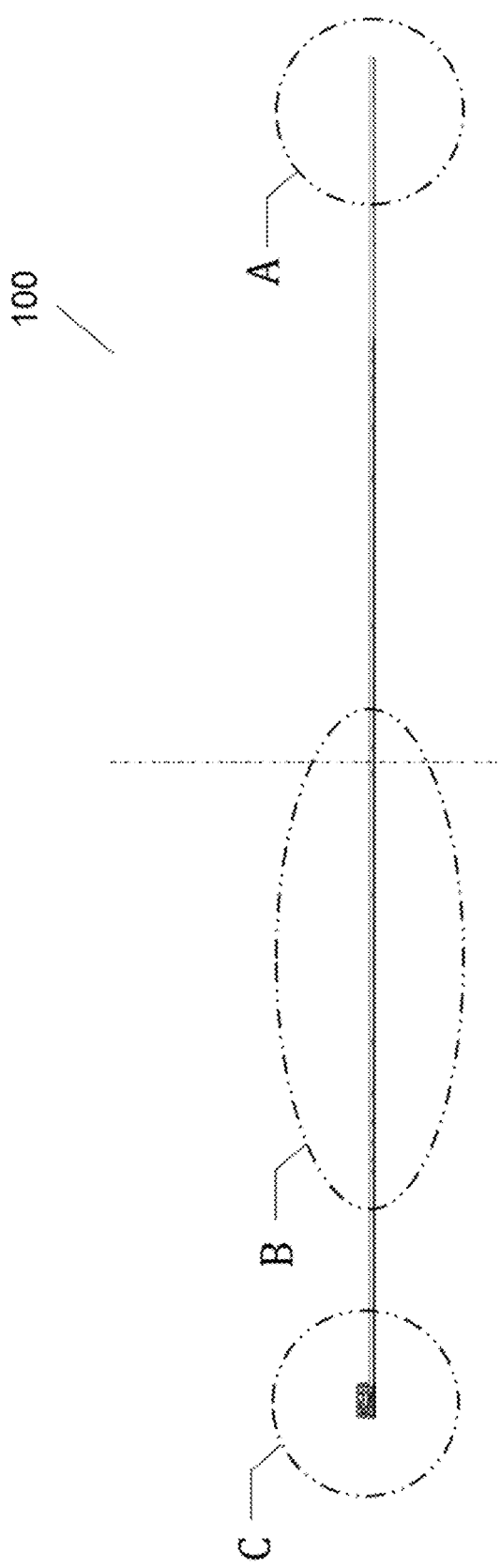
FIG. 1C shows a schematic side view of the mouse pad of FIG. 1B, according to various embodiments.

FIG. 1A shows a schematic top view of a mouse pad 100, according to various embodiments; FIG. 1B shows a schematic top view of the mouse pad 100 of FIG. 1A, with a mat 115 of the mouse pad removed to expose a lighting assembly 120 of the mouse pad 100, according to various embodiments; and FIG. 1C shows a schematic side view of the mouse pad 100 of FIG. 1B, according to various embodiments.

According to various embodiments, there may be provided the mouse pad 100.

The mouse pad 100 may include a base 110, the mat 115, as well as the lighting assembly 120 which may be sandwiched between the base 110 and the mat 115. According to various embodiments, the base 110, the mat 115, and the lighting assembly 120 may be held together by any suitable fastening means, for example, via an adhesive, and/or at least one fastener (e.g. screw 7 as shown in FIG. 1B, or snap fit arrangement, or latch, or pins, or rivet, or catch, etc.).

The base 110 of the mouse pad 100 may be a bottommost layer of the mouse pad 100 for interfacing with an external surface (e.g. a table top). According to various embodiments, an exposed (e.g. bottom) surface 111 of the base 110 may be configured with anti-slip properties. In particular, the exposed surface of the base 110 may include an anti-slip arrangement 113 (see FIG. 1D). For example, the bottom surface of the base 110 may include a rough surface of a material of the base 110 and/or may include non-slip patterns, anti-slip grooves, etc.

The mat 115 of the mouse pad 100 may be a topmost layer of the mouse pad 100 for providing an exposed tracking (e.g. top) surface 116 for a mouse device (not shown) to glide thereacross. Accordingly, the tracking surface 116 may be a smooth surface.

The lighting assembly 120 may be an intermediate layer of the mouse pad 100 sandwiched between the base 110 and the mat 115.

The lighting assembly 120 may include a light-emitting arrangement 160 and a light-transmitting body 130.

The light-emitting arrangement 160 may include a substrate 170 and a plurality of light sources (or light-emitting units) 180. According to various embodiments, as shown in FIG. 1B, the substrate 170 may be an elongate-shaped substrate 170. For example, the elongate-shaped substrate 170 may be of a shape including, but not limited to, a rectangular shape, an oblong shape, an elongated oval shape, a stadium shape, or a rounded rectangular shape. According to various embodiments, the elongate-shaped substrate 170 may correspond to (in other words, may be similar to) a shape of the mouse pad 100. Hence, for example, the mouse pad 100 may be of an elongate shape. According to various embodiments, the plurality of light sources 180 may be distributed lengthwise (or longitudinally) along the elongate-shaped substrate 170. Accordingly, the plurality of light sources 180 may be distributed in a manner so as to form a line parallel to a longitudinal axis of the elongate-shaped substrate 170. According to various embodiments, the plurality of light sources 180 may be mounted on a mounting surface 170a of the elongate-shaped substrate 170. Accordingly, the plurality of light sources 180 may be distributed along a length of the mounting surface 170a (e. g. of a top surface) of the elongate-shaped substrate 170. According to various embodiments, the plurality of light sources 180 may be arranged in a straight line, which may be parallel or substantially parallel with a straight/linear longitudinal edge 134 of the mouse pad 100 (or the light-transmitting body 130). Accordingly, the elongate-shaped substrate 170 may be oriented so as to be parallel or substantially parallel with the straight/linear longitudinal edge 134 of the mouse pad 100 (or the light-transmitting body 130). As an example, with reference to FIG. 1B, according to various embodiments, at least three or more than three (e. g. four, five, etc.) or more than half of a total number of the plurality of light sources 180 of the light-emitting arrangement 160 of the mouse pad 100 may be arranged in or along a straight line on the mounting surface 170a of the elongate-shaped substrate 170.

According to various embodiments, a direct distance (e.g. shortest distance) measured between each light source of the plurality of light sources 180 and a corresponding segment of an edge/side (e.g. lateral edge/side 133 or longitudinal edge/side 134) of the mouse pad 100 (or the light-transmitting body 130) for illuminating the said edge/side (e.g. lateral edge/side 133 or longitudinal edge/side 134) may be similar as one another or vary within a small range from each other. The direct distance may be a distance extending perpendicularly to the edge/side (e.g. lateral edge/side 133 or longitudinal edge/side 134). In this manner, according to various embodiments, the plurality of light sources 180 of the mouse pad 100 may provide or achieve uniform (e.g. generally uniform) illumination to the edge/side (e.g. lateral edge/side 133 or longitudinal edge/side 134) of the mouse pad 100 entirely or partially.

According to various embodiments, the elongate-shaped substrate 170 may be or may include, but not limited to, at least one of an electronic board, circuit board, printed circuit board, etc., or a flexible electronic board, flexible circuit board, flexible printed circuit board, etc. Each light source of the plurality of light sources 180, when mounted on the mounting surface 170a of the elongate-shaped substrate 170, may be in electrical connection with/to the elongate-shaped substrate 170. According to various embodiments, each light source of the plurality of light sources 180 may be a light-emitting diode (LED), such as a RGB (i.e. red, green, blue) LED, or any other type of light source.

According to various embodiments, the light-transmitting body 130 may be light-permeable and may allow light (e.g. emitted from the plurality of light sources 180) to pass through or across the light-transmitting body 130. According to various embodiments, the light-transmitting body 130 may be configured as or may include or may be a waveguide. The light-transmitting body 130 may include at least one light-input surface (referenced, for example, as "250" in FIG. 2) for light (e.g. from the plurality of light sources 180) to enter the light-transmitting body 130. Further, the light-transmitting body 130 may include a peripheral edge portion 140 (e.g. a light-output portion) for the light to exit the light-transmitting body 130. The peripheral edge portion 140 may be opposite (e.g. substantially opposite) the at least one light-input surface. The light-transmitting body 130 may further include a first surface 152 (e.g. a planar surface) (see FIG. 1D) and an opposite and/or parallel second surface 154 (e.g. a planar surface), which may be extending between the at least one light-input surface and the peripheral edge portion 140. Accordingly, the first surface 152 and the second surface 154 may, respectively, be a bottom surface and a top surface of the light-transmitting body 130 (e.g. when the mouse pad 100 is in an operational or use orientation, in other words, when the mouse pad 100 is in an upright or substantially upright orientation). According to various embodiments, when the mouse pad 100 is in the upright or substantially upright orientation, the at least one light-input surface may be an upright/vertical or substantially upright/vertical surface of the light-transmitting body 130. According to various embodiments, the first surface 152 and the second surface 154 may be capable of internally reflecting light within the light-transmitting body 130, for example, based on total internal reflection (described in greater detail later with reference to FIG. 2) and/or a reflective property (e.g. of a material) of the first surface 152 and of the second surface 154 of the light-transmitting body 130. Hence, the mouse pad 100, according to various embodiments, may be capable of providing visible illumination to a user of the mouse pad 100, via its peripheral edge portion 140, even when the mouse pad 100 is bent or rolled.

In particular, according to various embodiments, the light-emitting arrangement 160 and the light-transmitting body 130 may be assembled together in a manner to transmit light from the plurality of light sources 180 through the light-transmitting body 130 for illuminating the peripheral edge portion 140 of the light-transmitting body 130. For example, according to various embodiments, the light-transmitting body 130 may include at least one (e.g. one or more) hole(s)

(e.g. blind hole(s), through-hole(s), cut-out(s) etc.) (referenced, for example, as "5" in FIG. 2) shaped to or for accommodating the plurality of light sources 180 therein. According to various embodiments, at least one internal surface of the at least one hole may serve as the at least one light-input surface 250 through which light from the plurality of light sources 180 (e.g. positioned or disposed adjacent to the at least one light-input surface and/or oriented to face the at least one light-input surface) may be transmitted into/enter the light-transmitting body 130. As an example, according to various embodiments, the light-transmitting body 130 may include a plurality of holes, and each light source of the plurality of light sources 180 may be accommodated within a corresponding hole of the plurality of holes. As another example, according to various other embodiments, the light-transmitting body 130 may include a single (e.g. large or larger-sized) hole for accommodating all of the plurality of light sources 180.

Figure 1D:
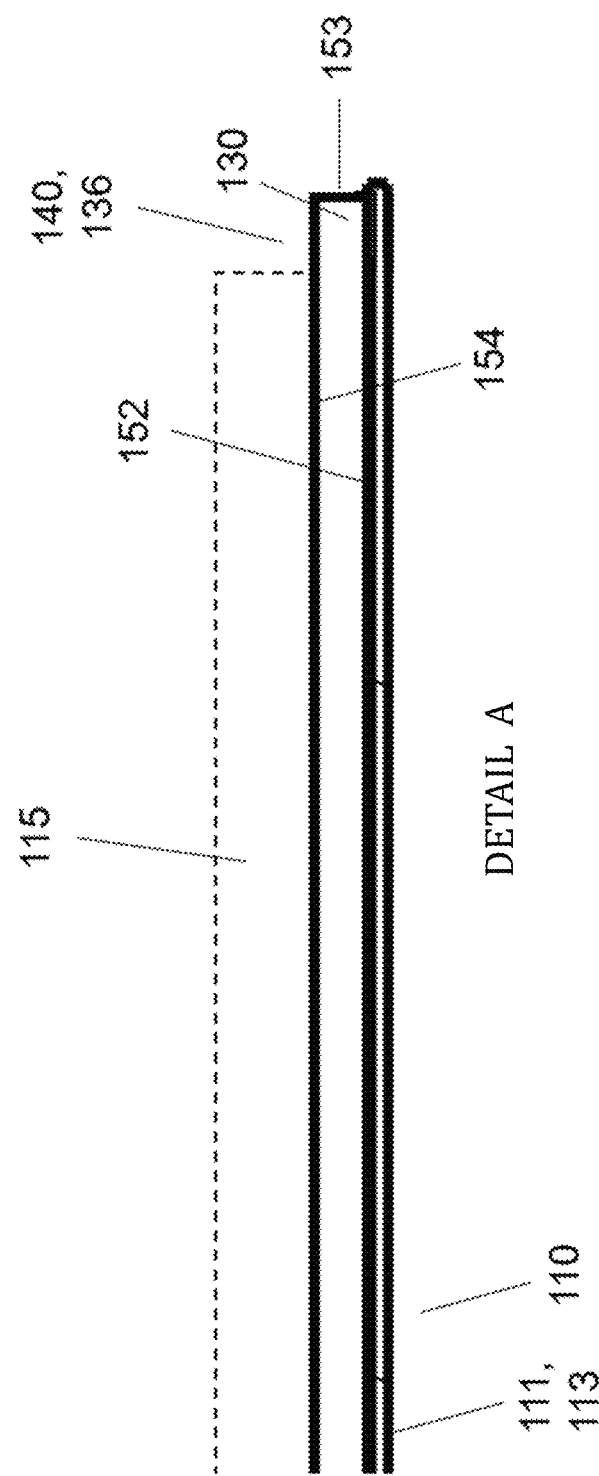

According to various embodiments, the light-transmitting body 130 may be sandwiched between the base 110 and the mat 115 and may have the peripheral edge portion 140 exposed from between the base 110 and the mat 115, such that light exiting from the peripheral edge portion 140 of the mouse pad may be visible to a user of the mouse pad 100. Specifically, according to various embodiments, the mat 115 (and/or the base 110) may be smaller than the light-transmitting body 130. The mat 115 (and/or the base 110) and the light-transmitting body 130 may be arranged in a concentric manner such that the peripheral edge portion 140 of the light-transmitting body 130 exposed between the mat 115 and the base 110 may include a border region 136 (see FIG. 1D) of the light-transmitting body 130 extending outwardly from (or, between) a perimeter of the mat 115 to (or, and) a perimeter of the light-transmitting body 130. According to various embodiments, the border region 136 of the light-transmitting body 130 may have a width (e.g. uniform width along the entire border region 136) within a range of 1 mm to 4 mm. For example, the entire border region 136 may have a uniform width of approximately 3 mm. As shown in FIG. 1D, according to various embodiments, the peripheral edge portion 140, which may include the border region 136 of the light-transmission body 130, may include at least (i) a segment (e.g. an exposed segment) of the second surface 154 (e.g. the top surface) of the light-transmission body 130 at an edge region of the light-transmission body 130 and (ii) a side surface (e.g. upright/vertical or substantially upright/vertical surface, e.g. exposed side surface) 153 of the light-transmitting body 130 extending between the first surface 152 and the second surface 154 of the light-transmitting body 130. Accordingly, light may exit from the side surface 153 of the light-transmitting body 130 in a first direction substantially parallel with the longitudinal centreline 132 and/or the transverse centreline 131 of the light-transmitting body 130 and/or exit from the segment (e.g. the exposed segment) of the second surface 154 of the light-transmission body 130 in a second direction substantially perpendicular to the first direction.

According to various embodiments, the light-transmitting body 130 may be an integral piece forming a single unit. As shown in FIG. 1B, according to various embodiments, the light-transmitting body 130 may be, for example, a plate-shaped (or panel-like) light-transmitting body 130 that may include a pair of opposite and/or parallel lateral edges/sides 133 (e.g. straight or substantially straight lateral edges/sides), a pair of opposite and/or parallel longitudinal edges/sides 134 (e.g. straight or substantially straight longitudinal edges/sides extending between the pair of lateral edges/sides 133), and four corners 135 (e.g. rounded, chamfered, or straight corners) by which the lateral edges/sides 133 and the longitudinal edges/sides 134 meet.

According to various embodiments, the mouse pad 100 may be a flexible mouse pad 100 capable of being bent, rolled, etc., while still being able to provide lighting effects (e.g. via its lighting assembly 120).

Accordingly, according to various embodiments, the base 110 of the mouse pad 100 may be a flexible base 110. The mat 115 of the mouse pad 100 may be a flexible mat 115. In other words, according to various embodiments, each of base 110 and the mat 115 of the mouse pad 100 may, respectively, be made of (e.g. entirely of) or may include a flexible material, for example, a polymer (e.g. flexible polymer, e.g. polyester etc.), a rubber (e.g. natural rubber), a cloth, fabric, leather, etc. Hence, for example, according to various embodiments, the base 110 may be made of natural rubber, and the mat 115 may be made of polyester.

Further, according to various embodiments, the light-transmitting body 130 may be a flexible light-transmitting body 130 (e.g. flexible waveguide, flexible optical instrument, etc.) for light transmission thereacross from the at least one light-input surface to the peripheral edge portion 140 of the flexible light-transmitting body 130. In particular, the light-transmitting body 130 may be made of (e.g. entirely of) or may include a flexible light-transmissive (e.g. transparent or translucent) material, for example, a glass (e.g. flexible glass), a polymer (e.g. flexible polymer, e.g. polycarbonate etc.), or any other suitable flexible light-transmissive material.

Further, according to various embodiments, the substrate 170 may be a flexible substrate 170. For example, according to various embodiments, the substrate 170 may be or may include at least one of a flexible electronic board, flexible circuit board, flexible printed circuit board, etc. According to various embodiments, the substrate 170 may be made of flexible polymer including, but not limited to, polyimide film or polyester film.

With reference to FIG. 1B, according to various embodiments, the light-transmitting body 130 may be an elongate-shaped light-transmitting body 130. As an example, FIG. 1B shows the light-transmitting body 130 as an elongate plate-shaped (or panel-like) light-transmitting body 130.

According to various embodiments, the light-emitting arrangement 160 and the light-transmitting body 130 (e.g. elongate-shaped light-transmitting body) of the mouse pad 100 may be assembled together (e.g. stacked) with the elongate-shaped substrate 170 (e.g. circuit board, flexible circuit board etc.) of the light-emitting arrangement 160 aligned longitudinally with respect to the elongate-shaped light-transmitting body 130. That is, according to various embodiments, a longitudinal centreline 172 of the elongate-shaped substrate 170 may be parallel (e.g. substantially parallel) with a longitudinal centreline 132 of the elongate-shaped light-transmitting body 130. In particular, as shown in FIG. 1B, according to various embodiments, the elongate-shaped substrate 170 may be centrally aligned with respect to the elongate-shaped light-transmitting body 130 such that the longitudinal centreline 172 of the elongate-shaped substrate 170 may coincide with the longitudinal centreline 132 of the elongate-shaped light-transmitting body 130 and/or such that a transverse centreline 171 of the elongate-shaped substrate 170 may coincide with a transverse centreline 131 of the elongate-shaped light-transmitting body 130

As shown, according to various embodiments, a length of the elongate-shaped substrate 170 (e.g. measured along the longitudinal centreline 172 of the elongate-shaped substrate 170) may be shorter than a length (e.g. total length) of the elongate-shaped light-transmitting body 130, while being longer than half the length (e.g. total length) of the elongate-shaped light-transmitting body 130. Further, a width of the elongate-shaped substrate 170 (e.g. measured along a direction perpendicular to the longitudinal centreline 172 of the elongate-shaped substrate 170) may be less than (e.g. less than half of or less than a quarter of) a width (e.g. total width) of the elongate-shaped light-transmitting body 130.

With reference to FIG. 1A and FIG. 1B, the peripheral edge portion 140 of the light-transmitting body 130 may extend (e.g. substantially around or entirely around) a perimeter of the mat 115. With reference to FIG. 1B, according to various embodiments, the peripheral edge portion 140 of the light-transmitting body 130 may include or may be divided into four quadrants 141, 142, 143, 144 (e.g. four equal or substantially equal sized quadrants). Each quadrant of the peripheral edge portion 140 of the light-transmitting body 130 may be bounded or defined by (i) the longitudinal centreline 132 of the light-transmitting body 130 and (ii) the transverse centreline 131 of the light-transmitting body 130 (N.B. the transverse centreline 131 of the light-transmitting body 130 being perpendicular to the longitudinal centreline 132). In particular, each quadrant of the peripheral edge portion 140 of the light-transmitting body 130 may include a respective/corresponding longitudinal edge segment 134a, 134b, 134c, 134d of the light-transmitting body 130, a respective/corresponding lateral edge segment 133a, 133b, 133c, 133d of the light-transmitting body 130, and a respective/corresponding corner segment 135a, 135b, 135c, 135d of the light-transmitting body 130 whereby (i.e. by which) the respective/corresponding longitudinal edge segment 134a, 134b, 134c, 134d and the respective/corresponding lateral edge segment 133a, 133b, 133c, 133d meet (in other words, the corner segment 135a, 135b, 135c, 135d may be between and may be connecting the longitudinal edge segment 134a, 134b, 134c, 134d and the lateral edge segment 133a, 133b, 133c, 133d).

According to various embodiments, the plurality of light sources 180 of the mouse pad 100 may include or may be divided into (i) a first sub-set of light sources configured to face and/or illuminate a first quadrant 141 of the peripheral edge portion 140 of the light-transmitting body 130, (ii) a second sub-set of light sources configured to face and/or illuminate a second quadrant 142 of the peripheral edge portion 140 of the light-transmitting body 130, (iii) a third sub-set of light sources configured to face and/or illuminate a third quadrant 143 of the peripheral edge portion 140 of the light-transmitting body 130, and (iv) a fourth sub-set of light sources configured to face and/or illuminate a fourth quadrant 144 of the peripheral edge portion 140 of the light-transmitting body 130.

According to various embodiments, light sources (e. g. at least two or more than a two or all light sources) among each sub-set of light sources (i. e. of the (i) first sub-set of light sources, (ii) second sub-set of light sources, (iii) third sub-set of light sources, and (iv) fourth sub-set of light sources) of the plurality of light sources 180 may be oriented with (their respective) beam axes directed in different directions from each other in a manner so as to form different angles with respect to the longitudinal centreline 132 of the light-transmitting body 130. The beam axis of each light source may be a line from the light source along a centre of a light beam emitted from the light source. According to various embodiments, the light sources among each sub-set of light sources of the plurality of light sources may be oriented such that the spread of light (or beam spread) of the light sources together may continuously cover the corresponding quadrant 141, 142, 143, 144 of the peripheral edge portion 140 of the light-transmitting body 130 to provide even or uniform (i. e. generally uniform) or uninterrupted illumination along the corresponding quadrant 141, 142, 143, 144 of the peripheral edge portion 140 of the light-transmitting body 130. Accordingly, the plurality of light sources 180 may be capable of providing even or uniform (e. g. generally uniform) or uninterrupted illumination to the peripheral edge portion 140 (e. g. entire unobstructed peripheral edge portion 140) of the mouse pad 100.

According to various embodiments, each sub-set of light sources of the plurality of light sources 180 may include (i) at least one (e.g. one or two or more) light source oriented to face and/or illuminate the longitudinal edge segment 134a, 134b, 134c, 134d of the light-transmitting body 130, (ii) at least one light source oriented to face and/or illuminate the lateral edge segment 133a, 133b, 133c, 133d of the light-transmitting body 130, and (iii) at least one light source oriented to face and/or illuminate the corner segment 135a, 135b, 135c, 135d of the light-transmitting body 130. According to various embodiments, the at least one light source of each sub-set of light sources of the plurality of light sources 180 configured to or for illuminating the longitudinal edge segment 134a, 134b, 134c, 134d of the light-transmitting body 130 may be oriented with a (i.e. its) beam axis (or a normal line of a light-emitting surface of the said at least one light source) intersecting the longitudinal edge segment 134a, 134b, 134c, 134d of the light-transmitting body 130 in a non-perpendicular manner. The at least one light source of each sub-set of light sources of the plurality of light sources 180 configured to or for illuminating the lateral edge segment 133a, 133b, 133c, 133d of the light-transmitting body 130 may be oriented with a beam axis intersecting the lateral edge segment 133a, 133b, 133c, 133d of the light-transmitting body 130 in a non-perpendicular manner. The at least one light source of each sub-set of light sources of the plurality of light sources 180 configured to or for illuminating the corner segment 135a, 135b, 135c, 135d of the light-transmitting body 130 may be oriented with a beam axis directed in a direction non-perpendicular to the longitudinal edge segment 134a, 134b, 134c, 134d of the light-transmitting body 130 and non-perpendicular to the lateral edge segment 133a, 133b, 133c, 133d of the light-transmitting body 130 in a non-perpendicular manner. As an example, the non-perpendicular manner may be such that the beam axis or the normal line forms an acute angle (e.g. within 1° to 89°) with respect to the respective/corresponding edge segment (i.e. the longitudinal edge segment 134a, 134b, 134c, 134d/the lateral edge segment 133a, 133b, 133c, 133d) or the respective/corresponding corner segment 135a, 135b, 135c, 135d of the respective/corresponding quadrant.

FIG. 1D and FIG. 1E show schematic close-up side views of the mouse pad 100 of FIG. 1C, according to various embodiments.

With reference to FIG. 1E, as well as referring back to FIG. 1B, according to various embodiments, each sub-set of light sources of the plurality of light sources 180 may be distributed lengthwise along the elongate-shaped substrate 170 in a manner so as to be spaced apart from each other at increasing intervals towards the transverse centreline 131 of the light-transmitting body 130 and/or the transverse centreline 171 of the substrate 170 (e. g. when the substrate 170 is centrally aligned with the light-transmitting body 130). Accordingly, a distance between two adjacent light sources may be larger for light sources placed closer to the transverse centreline 131 as compared to adjacent light sources further from the transverse centreline 131.

According to various embodiments, the spacing of the light sources as described may lead to a reduced or minimal number of (potential) hot spots within the mouse pad 100 (e.g. when the light sources of the mouse pad are in operation to emit light and, in turn, generate heat).

As shown, neighbouring (e.g. immediately adjacent) light sources within a first group (i.e. distal from a corresponding lateral edge 133 of the light-transmission body 130) of light sources of each sub-set of light sources may be spaced apart from each other within a first range of distances, while neighbouring (e.g. immediately adjacent) light sources within a second group (i.e. proximal to a corresponding lateral edge 133 of the light-transmission body 130) of light sources of the (same) sub-set of light sources may be spaced apart from each other within a second range of distances, whereby the second range of distances is smaller than a minimum value of the first range of distances.

According to various embodiments, the plurality of light sources 180 of the light-emitting arrangement 160 of the mouse pad 100 may be or may include thirty-two light sources. Accordingly, when the plurality of light sources 180 is or includes thirty-two light sources, each sub-set of light sources may be or may include eight light sources (i.e. from among the thirty-two light sources). Further, according to various embodiments, when the plurality of light sources 180 is or includes thirty-two light sources, the first group of light sources of each sub-set of light sources may be or may include three (or four) light sources proximal to the transverse centreline 131 of the light-transmitting body 130 and/or the transverse centreline 171 of the substrate 170, while the second group of light sources of each sub-set of light sources may be or may include five (or four) light sources distal from the transverse centreline 131 of the light-transmitting body 130 and/or the transverse centreline 171 of the substrate 170.

With reference to FIG. 1A and FIG. 1B, the mouse pad 100 may further include a controller 190 for controlling the plurality of light sources 180, according to various embodiments. Thus, when the plurality of light sources 180 is or includes a plurality of LEDs, the controller 190 may be a "LED controller". The controller 190, according to various embodiments, may include a processor configured to or for performing or executing a function or instruction such as controlling a colour (e.g. red, green, blue etc.), a brightness level (or light intensity), a lighting duration (e.g. duration of light emittance), a lighting pattern, a lighting effect, etc., of each or any one or more or all light source(s) of the plurality of light sources 180. Hence, for example, the controller 190 may be configured to control a colour, a brightness, a duration of light emittance (or lighting duration), a lighting pattern, a lighting effect, etc. of each sub-set of light sources for illuminating respective quadrant(s) 141, 142, 143, 144 independently. As yet another example, the controller 190 may be configured to synchronously control a colour, a brightness, a duration of light emittance (or lighting duration), a lighting pattern, a lighting effect, etc. of the plurality of light sources 180. According to various embodiments, the plurality of light sources 180 may be divided into a plurality of sub-groups. Each sub-group may include at least one (in other words, one or two or more) light source(s) for lighting a corresponding segment (also referred to as a "lighting zone") of the peripheral edge portion 140 of the mouse pad 100. The sub-groups may contain a same number of light source(s) or a different number of light-source(s) from one another. As an example, the plurality of light sources 180 (e.g. thirty-two light sources) may be divided into ten sub-groups for lighting ten corresponding lighting zones. As another example, the plurality of light sources 180 (e.g. thirty-two light sources) may be divided into twenty sub-groups for lighting twenty corresponding lighting zones. According to various embodiments, the controller 190 may be configured to control the plurality of light sources 180 according to or by their sub-groups.

The controller 190 may include an interface 191 (e.g. port, connector, Universal Serial Bus (USB), etc.) for connecting to a computing device (e.g. external power source, computer(s), tablet(s), smart phone(s), flash drive(s), and portable hard drive(s)) for supplying power to the controller 190 which may, in turn, transmit power (e.g. electrical energy) to the plurality of light sources 180 via the substrate 170 (e.g. electronic board, circuit board, etc.). According to various other embodiments, the mouse pad 100 may include an internal power source (e.g. built-in power source, removable/fixed battery, etc.) and/or an energy harvesting unit (e.g. solar panel) (not shown) for providing power to the various electrical components of the mouse pad 100.

According to various embodiments, the controller 190 may be configured to receive data from a computing device (e.g. an external computing device) that is connected to the controller 190 via the interface 191. The data (i.e. transmitted from the computing device to the controller 190 of the mouse pad 100) may include instructions from the computing device, for example, on how to operate each of the plurality of light sources 180. That is, the data (i.e. transmitted from the computing device to the controller 190 of the mouse pad 100) may include instructions on how any one or more or all of the plurality of light sources 180 is to be operated and/or lighted and/or controlled (e.g. by the controller 190) independently or synchronously with at least one other light source of the plurality of light sources 180. For example, the controller 190 may be configured and/or instructed (e.g. by the computing device) to control at least one or more of a colour, duration, and/or frequency of light produced or emitted by any one or more or all of the plurality of light sources 180. According to various embodiments, the controller 190 of the mouse pad 100 may also transmit a data to the computing device (e.g. external computing device), for example (and/or which may include), a status report of the mouse pad 100, and/or an identifier of the mouse pad 100. According to various embodiments, the interface 191 may be, for example, a wireless transceiver configured to transmit and receive any one of Bluetooth, WiFi, ZigBee, infrared signals, etc.

As shown in FIG. 1A and FIG. 1B, according to various embodiments, the controller 190 may be disposed at a lateral edge 133 of the light-transmitting body 130. Further, as shown in FIG. 1B, the controller 190 may be connected to a longitudinal end 173 of the substrate (e.g. elongate-shaped substrate) 170.

Figure 2:
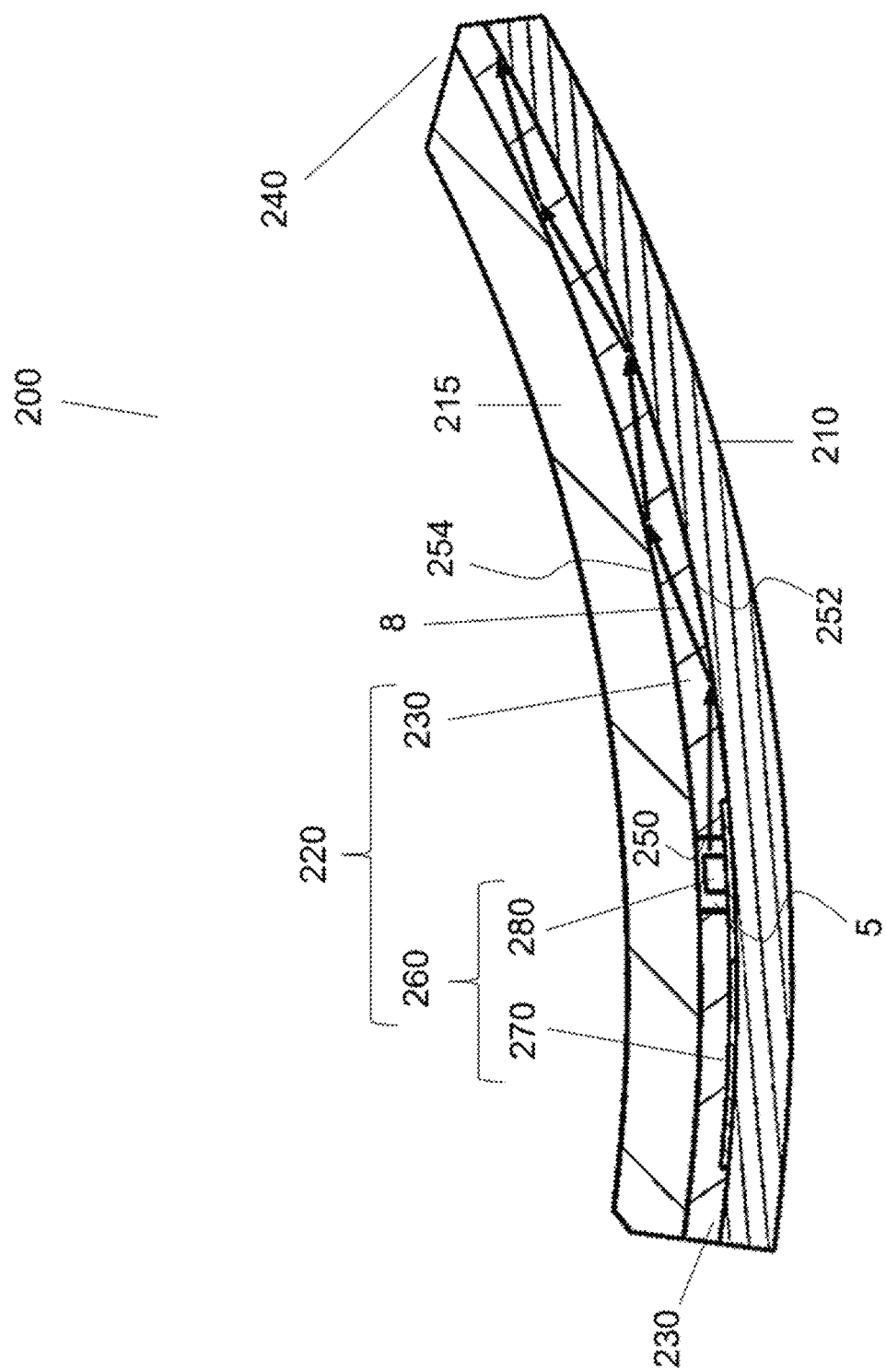
FIG. 2 shows a schematic side view of a mouse pad 200, according to various embodiments.

FIG. 2 shows a schematic side view of a mouse pad 200, according to various embodiments.

According to various embodiments, there may be provided the mouse pad 200. The mouse pad 200 may include any one or more or all the feature(s) and/or limitation(s) of the mouse pad 100 of FIG. 1A and FIG. 1B. In the following, the mouse pad 200 is described with like reference characters generally referring to the same or corresponding parts/features of the mouse pad 100 of FIG. 1A and FIG. 1B. The description of the parts/features made with respect to the mouse pad 200 may also be applicable with respect to the mouse pad 100, and vice versa.

With reference to FIG. 2, the mouse pad 200 may, similar to the mouse pad 100 of FIG. 1A and FIG. 1B, include a base 210, a mat 215 and a lighting assembly 220.

As shown, according to various embodiments, the lighting assembly 220 may include a light-emitting arrangement 260 and a light-transmitting body 230.

The light-emitting arrangement 260 of the mouse pad 200 may, similar to the light-emitting arrangement 160 of the mouse pad 100 of FIG. 1A and FIG. 1B, include a substrate 270 (e.g. flexible substrate, flexible printed circuit board, etc.) and a plurality of light sources 280 disposed on the substrate 270.

The light-transmitting body 230 may be a flexible light-transmitting body 230 which may include a first surface 252 (e.g. a planar surface) and an opposite second surface 254 (e.g. a planar surface). The first surface 252 may be parallel (e.g. substantially parallel) with the second surface 254. The light-transmission body 230 may further include at least one light-input surface 250 (e.g. a light-output portion) and a peripheral edge portion 240 opposite the at least one light-input surface 250, which are extending (e.g. uprightly) between the first surface 252 and the second surface 254 of the light-transmitting body 230.

With reference to FIG. 2, a light or a light beam/ray 8 emitted by the plurality of light sources 280 that enters the light-transmitting body 230, via the at least one light-input surface 250, may be transmitted to the peripheral edge portion 240 by way of total internal reflection (e.g. of incident light rays on the inner faces of the first surface 252 and the second surface 254 of the light-transmission body 230). As shown, light transmission across the light-transmitting body 230 (e.g. by way of total internal reflection) may occur even when the mouse pad 200 (e.g. at least a portion of the mouse pad) is bent or curved. By way of example, the plurality of light sources 280 may be side-emitting LEDs which may emit light sideways toward the light-input surface 250, across the substrate 270. Hence, according to various embodiments, a beam axis of each of the plurality of light sources 280 may be intersecting (e.g. may be substantially perpendicular or normal to) the light-input surface 250.

Various embodiments may thus provide a mouse pad (or mouse pad device) capable of providing illumination via its peripheral edge portion. The mouse pad of various embodiments may also be flexible, while providing the illumination via its peripheral edge portion.

Various embodiments may also provide a mouse pad capable of providing generally uniform illumination via its peripheral edge portion, particularly, by way of its configuration of its plurality of light sources and its substrate.

Various embodiments may also provide the mouse pad capable of providing generally uniform illumination via its peripheral edge portion, while reducing a number of potential hot spots on the mouse pad while the mouse pad (or mouse pad device) is in operation.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A mouse pad comprising:
a base;
a mat; and
a lighting assembly sandwiched between the base and the mat;
wherein the lighting assembly comprises:
a light-transmission body sandwiched between the base and the mat, the light-transmission body having a peripheral edge portion exposed from between the base and the mat, and
a light-emitting arrangement comprising
an elongate-shaped substrate, and
a plurality of light sources distributed lengthwise along a length of a mounting surface of the elongate-shaped substrate,
wherein the light-emitting arrangement and the light-transmission body are assembled together in a manner to transmit light from the plurality of light sources through the light-transmission body for illuminating the peripheral edge portion of the light-transmission body.

2. The mouse pad of claim 1,
wherein the base is a flexible base;
wherein the mat is a flexible mat;
wherein the light-transmission body is a flexible light-transmission body; and
wherein the substrate is a flexible substrate.

3. The mouse pad of claim 1,
wherein the light-transmission body is an elongate-shaped light-transmission body; and
wherein the light-emitting arrangement and the light-transmission body are assembled together with the elongate-shaped substrate aligned longitudinally with respect to the elongate-shaped light-transmission body.

4. The mouse pad of claim 3,
wherein the elongate-shaped substrate is centrally aligned with respect to the elongate-shaped light-transmission body such that a longitudinal centreline of the elongate-shaped substrate coincides with a longitudinal centreline of the elongate-shaped light-transmission body.

5. The mouse pad of claim 1,
wherein the peripheral edge portion of the light-transmission body extends around a perimeter of the mat;
wherein the plurality of light sources comprises:
a first sub-set of light sources configured to illuminate a first quadrant of peripheral edge portion of the light-transmission body,
a second sub-set of light sources configured to illuminate a second quadrant of the peripheral edge portion of the light-transmission body,
a third sub-set of light sources configured to illuminate a third quadrant of the peripheral edge portion of the light-transmission body, and
a fourth sub-set of light sources configured to illuminate a fourth quadrant of the peripheral edge portion of the light-transmission body,
wherein each quadrant of the peripheral edge portion of the light-transmission body is defined by a longitudinal centreline of the light-transmission body and a transverse centreline of the light-transmission body.

6. The mouse pad of claim 5,
wherein light sources among each sub-set of light sources are oriented with beam axes directed in different directions from each other in a manner so as to form different angles with respect to the longitudinal centreline of the light-transmission body.

7. The mouse pad of claim 5,
wherein each quadrant of the peripheral edge portion of the light-transmission body comprises a longitudinal edge segment of the light-transmission body, a lateral edge segment of the light-transmission body, and a corner segment of the light-transmission body whereby the longitudinal edge segment and the lateral edge segment meet;
wherein each sub-set of light sources of the plurality of light sources comprises:
at least one light source oriented to illuminate the longitudinal edge segment of the light-transmission body,
at least one light source oriented to illuminate the lateral edge segment of the light-transmission body, and
at least one light source oriented to illuminate the corner segment of the light-transmission body.

8. The mouse pad of claim 7,
wherein the at least one light source for illuminating the longitudinal edge segment of the light-transmission body is oriented with a beam axis intersecting the longitudinal edge segment of the light-transmission body in a non-perpendicular manner,
wherein the at least one light source for illuminating the lateral edge segment of the light-transmission body is oriented with a beam axis intersecting the lateral edge segment of the light-transmission body in a non-perpendicular manner,
wherein the at least one light source for illuminating the corner segment of the light-transmission body is oriented with a beam axis directed in a direction non-perpendicular to the longitudinal edge segment of the light-transmission body and non-perpendicular to the lateral edge segment of the light-transmission body in a non-perpendicular manner.

9. The mouse pad of claim 5,
wherein each sub-set of light sources of the plurality of light sources is distributed lengthwise along the elongate-shaped substrate in a manner so as to be spaced apart from each other at increasing intervals towards the transverse centreline of the light-transmission body.

10. The mouse pad of claim 1,
wherein the plurality of light sources comprises 32 light sources.

11. The mouse pad of claim 5,
wherein each sub-set of light sources of the plurality of light sources comprises 8 light sources.

12. The mouse pad of claim 1,
wherein the mat is smaller than the light-transmission body, and the mat and the light-transmission body are arranged in a concentric manner such that the peripheral edge portion of the light-transmission body exposed between the mat and the base includes a border region of the light-transmission body extending outwardly from a perimeter of the mat to a perimeter of the light-transmission body,
wherein the border region of the light-transmission body has a width with a range of 1 mm to 4 mm.

13. The mouse pad of claim 1,
wherein the light-transmission body comprises at least one hole for accommodating the plurality of light sources therein;
wherein the at least one hole defines an internal surface serving as a light input surface through which light from the plurality of light sources is transmitted into the light-transmission body.

14. The mouse pad of claim 13,
wherein the light-transmission body comprises a plurality of holes, wherein each light source of the plurality of light sources is accommodated within a corresponding hole of the plurality of holes.

15. The mouse pad of claim 1, further comprising:
a controller electrically coupled to the plurality of light sources and configured to control at least one of a brightness, a colour, a lighting pattern, or a lighting duration of the plurality of light sources.

16. The mouse pad of claim 15,
wherein the controller comprises an interface for connecting to a computing device.

17. The mouse pad of claim 15,
wherein the controller is disposed at a lateral edge of the light-transmission body and is connected to a longitudinal end of the elongate-shaped substrate.

18. The mouse pad of claim 1,
wherein an exposed surface of the base comprises an anti-slip arrangement.

* * * * *